United States Patent
Darras (10) Patent No.: US 10,856,379 B2
(45) Date of Patent: Dec. 1, 2020

(54) PRIVACY GLASS SYSTEM

(71) Applicant: LuxTech, LLC, Philadelphia, PA (US)

(72) Inventor: Sean R. Darras, Media, PA (US)

(73) Assignee: LuxTech, LLC, Philadelphia, PA (US)

( * ) Notice: Subject to any disclaimer, the term of this patent is extended or adjusted under 35 U.S.C. 154(b) by 0 days.

(21) Appl. No.: 16/597,377

(22) Filed: Oct. 9, 2019

(65) Prior Publication Data
US 2020/0128637 A1    Apr. 23, 2020

Related U.S. Application Data

(60) Provisional application No. 62/747,551, filed on Oct. 18, 2018.

(51) Int. Cl.
| | |
|---|---|
| G06F 1/02 | (2006.01) |
| H05B 41/00 | (2006.01) |
| H05B 45/10 | (2020.01) |
| F21V 8/00 | (2006.01) |
| H05B 45/20 | (2020.01) |

(52) U.S. Cl.
CPC ........... H05B 45/10 (2020.01); G02B 6/0036 (2013.01); G02B 6/0065 (2013.01); G02B 6/0095 (2013.01); H05B 45/20 (2020.01)

(58) Field of Classification Search
CPC .. G01D 11/28; B60K 2350/203; B60K 37/02; B60Q 3/004; B60Q 3/044; G02B 6/0068; G02B 6/0018; G02B 6/0021; G02B 6/0001; G02B 6/0036; G02B 6/0046; G02B 6/0028; G02B 6/0038; G02B 6/0061; G02B 6/003; G02F 1/133603
See application file for complete search history.

(56) References Cited

U.S. PATENT DOCUMENTS

| | | | |
|---|---|---|---|
| 5,825,436 A | 10/1998 | Knight | |
| 9,910,301 B2 | 3/2018 | Branda et al. | |
| 2008/0186737 A1 | 8/2008 | Awai et al. | |
| 2011/0058113 A1 | 3/2011 | Threlkel et al. | |
| 2013/0038643 A1 | 2/2013 | Chung et al. | |
| 2014/0300274 A1* | 10/2014 | Acatrinei | H05B 33/0815 315/85 |
| 2016/0011429 A1* | 1/2016 | Vdovin | H04N 13/361 359/462 |
| 2016/0091760 A1* | 3/2016 | Ogura | G02F 1/133611 349/69 |
| 2016/0356942 A1* | 12/2016 | Cherekdjian | B32B 17/10761 |

(Continued)

FOREIGN PATENT DOCUMENTS

| | | |
|---|---|---|
| CN | 201071674 Y | 6/2008 |
| KR | 10-1367913 B1 | 2/2014 |

OTHER PUBLICATIONS

International Search Report and Written Opinion dated Jan. 16, 2020 for International Application No. PCT/US2019/56633, 12 pages.

(Continued)

*Primary Examiner* — Minh D A
(74) *Attorney, Agent, or Firm* — Cooley LLP (57) ABSTRACT

The disclosure relates in general to privacy glass, and more particularly, to a privacy glass system containing a light source, a diffuser, and a control and power circuitry combined in such a fashion as to make the level of visibility through the privacy glass system controllable.

17 Claims, 5 Drawing Sheets

(56) References Cited

U.S. PATENT DOCUMENTS

2017/0183867 A1    6/2017  Sollohub et al.
2019/0228719 A1    7/2019  Kato
2020/0124238 A1    4/2020  Darras

OTHER PUBLICATIONS

International Search Report and Written Opinion dated Jan. 16, 2020 for International Application No. PCT/US2019/56634, 11 pages.
AEC Info "Infinity Edge Double Glazed" Product Catalogue [online]. Oct. 7, 2007 [retrieved Dec. 20, 2019]. Retrieved from the Internet: <URL: https://www.aecinfo.com/1/company/08/72/37/product329603_1.html#spects>, p. 2, figure 1, figure 1 description (2 pages).
CB2 "Infinity 32"×76" Floor Mirror" Product Catalogue [online]. Jun. 19, 2012 [retrieved Dec. 17, 2019]. Retrieved from the Internet: <URL:https:///www.cb2.com/infinity-32×76-floor-mirror/s178538>, 3 pages.
Non-Final Office Action dated May 27, 2020 for U.S. Appl. No. 16/597,384, 8 pages.
Final Office Action dated Sep. 8, 2020 for U.S. Appl. No. 16/597,384, 13 pages.

\* cited by examiner

PRIVACY GLASS SYSTEM

CROSS-REFERENCE TO RELATED APPLICATIONS

This application claims priority and the benefit of U.S. Provisional Application No. 62/747,551, filed Oct. 18, 2018, entitled "Privacy Glass System", which is hereby incorporated herein by reference in its entirety.

FIELD

The disclosure relates in general to privacy glass, and more particularly, to a privacy glass system containing a light source, a diffuser, and control and power circuitry combined in such a fashion as to make the level of visibility through the privacy glass system controllable.

BACKGROUND

It is frequently desirable to have privacy glass that has a surface with a transparency or opacity that is controllable. For example, in an office it may be desirable to be able to see through a window during normal work, but have the window block viewing during a private meeting.

Known privacy glass typically requires a specialty glass material that is electrically activated to transform a clear transparent panel into an opaque panel. This material can be expensive, limiting the usage to date.

In recent years, the performance of LEDs (Light Emitting Diodes) has improved to the point where they are highly cost-effective. It would be desirable to have an LED system that could be used to change the degree of opacity of a privacy glass system under electrical control at reasonable cost. It would be further desirable if such a system could also alter the color of the privacy glass system when in the non-transparent state.

SUMMARY

In one or more embodiments, the privacy glass system comprises a light source, control and power circuitry, and a diffuser. Under control of the control circuitry (also referred herein to as a controller), the power circuitry powers the light source. When the light source is powered to the "on" state, the light source illuminates the diffuser, which diffuses the light from the light source in such a way as to make the diffuser opaque.

In one or more embodiments, the privacy glass system uses a frame containing the privacy glass. The privacy glass system may also contain one or two transparent materials. The transparent materials may be placed on opposite sides of the diffuser. The light from the diffuser passes through the transparent material or materials, providing scratch-resistance to the diffuser. The frame may include an infinity edge, creating the effect that the emitting surface of the transparent material(s) is detached from, and floating above the frame. The frame may also include a shroud to more closely resemble a traditional window or skylight. For example, the shroud can be coupled to and disposed a non-zero distance from the frame.

In one or more embodiments, the light source may be a set of white LEDs and the power circuitry may be for example a constant current driver to run the LEDs. The control circuitry, may be an on/off switch, or may provide the ability to set the brightness of the LEDs by controlling the output current of the power circuitry.

In another embodiment, the light source may be a set of multi-colored LEDs, such as red, green and blue (RGB). The power circuitry may be for example a set of constant current drivers to run the set of LEDs at different respective currents. The control circuitry may provide ability to set the color, CCT and/or CRI of the LEDs by controlling the output currents of the drivers of the power circuitry.

In one or more embodiments, the diffuser comprises a sheet of translucent material, with the light source placed along one or more of its edges. In another embodiment, the diffuser comprises a panel containing diffusion beads. In another embodiment, the diffuser may be an etched light guide plate, made of acrylic. In a further embodiment, the diffuser may be an LCD (Liquid Crystal Display) panel.

In one or more embodiments, the transparent material or materials may be glass or transparent plastic. The transparent material or materials may be offset (by a non-zero distance) from the diffuser, to provide a sense of depth to the light coming from the diffuser.

In one or more embodiments, the frame may be aluminum or wood.

In one or more embodiments, a collection of such privacy glass systems may be mounted together by an array of vertical or horizontal wall mount channels, with each individual frame having hardware to mount against the channels.

Such embodiments may be made to closely resemble windows or curtain walls, or panels thereof, and thus may be used for example, to resemble such systems even in the interior of buildings.

BRIEF DESCRIPTION OF THE DRAWINGS

The accompanying drawings are included to provide a further understanding of the disclosure, and are incorporated in and constitute a part of this specification.

DETAILED DESCRIPTION

Reference will now be made in detail to the various embodiments, examples of which are illustrated in the accompanying drawings. Wherever possible, the same reference numbers are used in the drawings and the description to refer to the same or like parts.

According to the design characteristics, a detailed description of the embodiments is given below.

Figure 1:
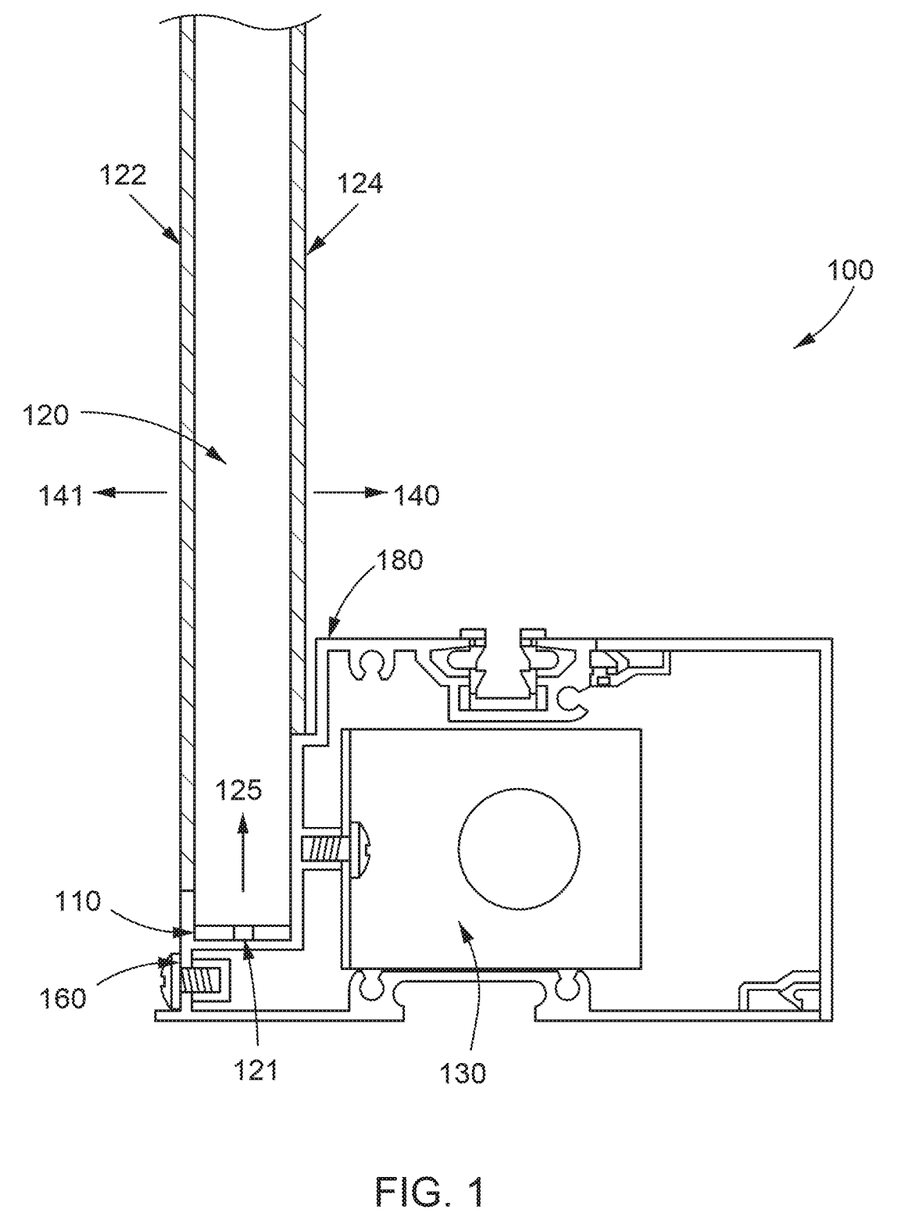
FIG. 1 is a diagram of a privacy glass system, according to an embodiment.

FIG. 1 is a diagram of a privacy glass system 100, according to an embodiment. As shown in FIG. 1, the light emission is from a light engine 110, which may be for example a linear row of LEDs, and which is placed along an edge 121 of a diffuser 120. In operation, the light engine is driven by power circuitry 130, which may be an AC line-powered constant current driver. In another embodiment, multiple light engines 110 may be emit light into multiple edges 121 of the diffuser 120.

The light emitted by the light engine 110 goes through an edge 121 of the diffuser 120 in a direction 125, and is then diffused by the diffuser 120 through transparent material 122 and 124. The diffuser 120 can be disposed between transparent material 122 on one side and transparent material 124 on the other side. The transparent materials 122 and 124 can be, for example, a glass or a plastic. The resulting light is emitted by the diffuser 120 perpendicular to the direction 125 of emission by the light engine 110, which may be both a forward direction 140 and a backward direction 141, or primarily in the forward direction 140. The light emitted from the diffuser 120 may be sufficient to cause the diffuser to be opaque. The backward direction 141 and the forward direction 140 are substantially perpendicular to the direction 125 in that light from the diffuser 120 may vary from the backward direction 141 and the forward direction 140 due to the nature of the diffuser 120. Such light from diffuser 120 will then vary a corresponding amount from the direction 125.

As shown in FIG. 1, the light engine 110 and the diffuser 120 may be mounted together in a base extrusion 160, which is part of the privacy glass system 100. As shown in FIG. 1, the privacy glass system 100 may optionally include an infinity edge 180. Note that although a particular structure of the frame is shown in FIG. 1, other frame structures are possible. For example, the infinity edge is optional and not included in some other embodiments.

Figure 2:
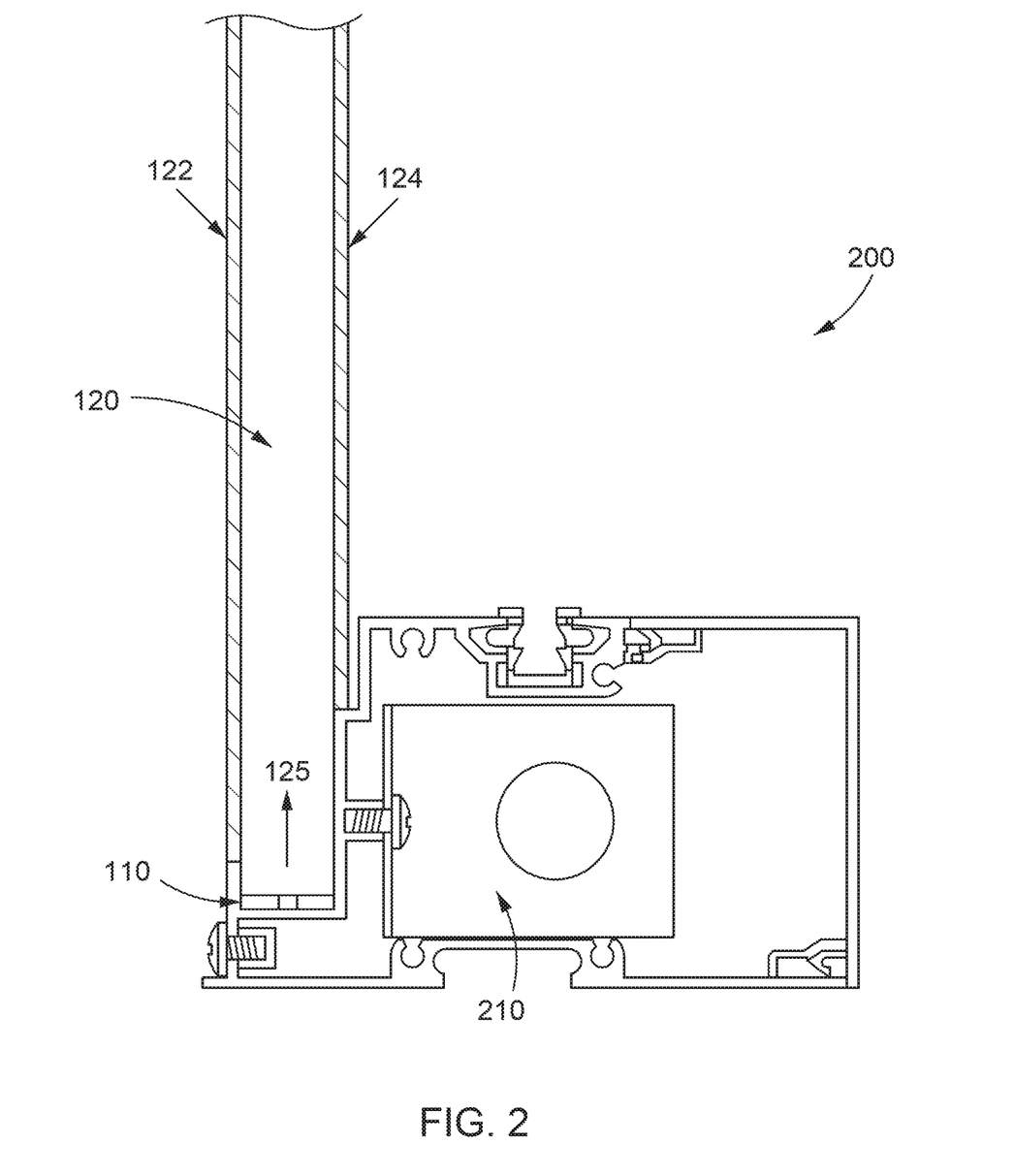
FIG. 2 is a diagram of a privacy glass system with controllable opacity, according to another embodiment.

FIG. 2 is a diagram of a privacy glass system 200 with controllable opacity, according to another embodiment. As shown in FIG. 2, the light engine 110 is driven by the power and control circuitry 210. The power circuitry of the power and control circuitry 210 may be for example an AC line-powered adjustable current driver. The control circuitry of the power and control circuitry 210 may respond to control signals to adjust the current to the light engine 110, causing the light output from the light engine 110 to dim or brighten, resulting in decreased or increased opacity respectively.

Figure 3:
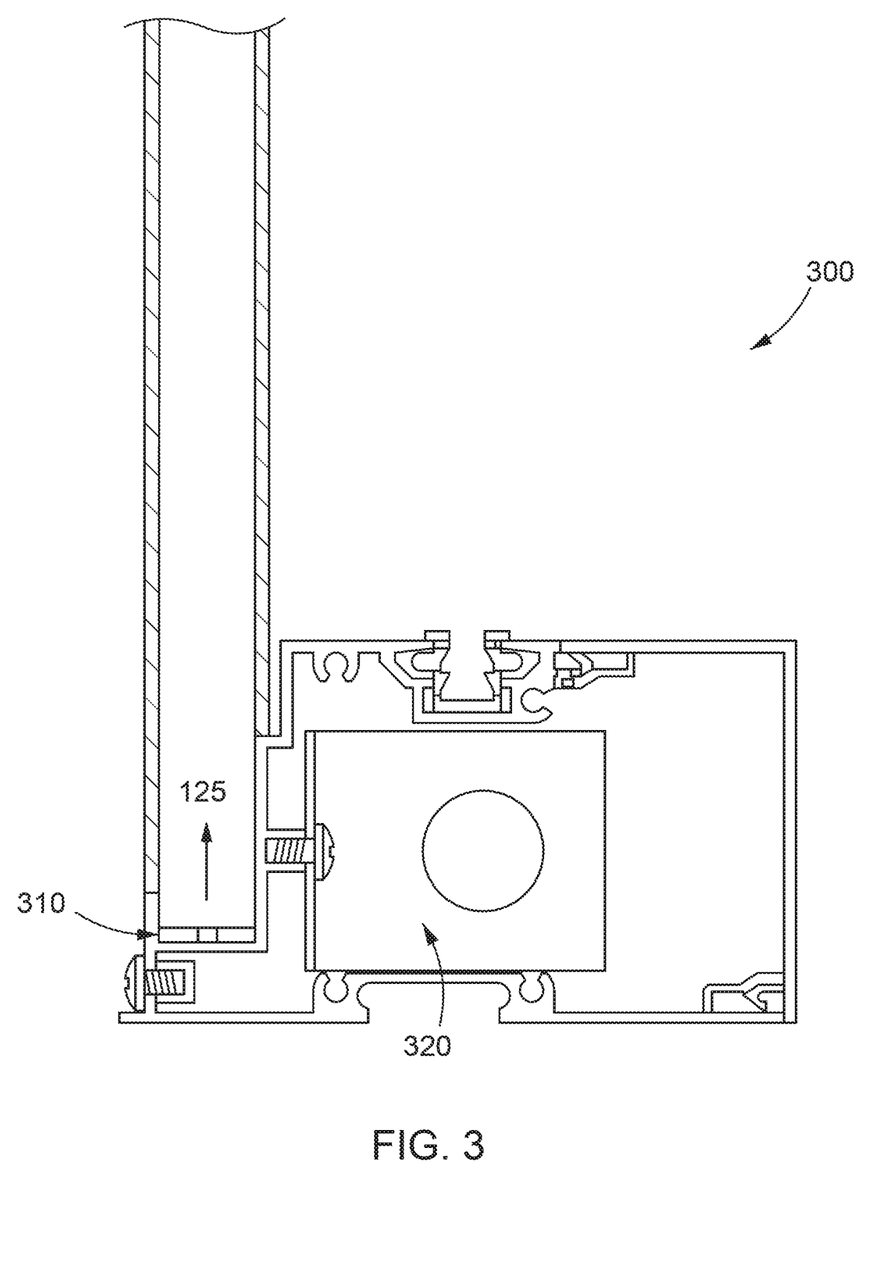
FIG. 3 is a diagram of a privacy glass system with controllable opacity and color, according to another embodiment.

FIG. 3 is a diagram of a privacy glass system 300 with controllable opacity and color, according to another embodiment. As shown in FIG. 3, the light engine 310 comprises multiple colors of LEDs, for example red, green and blue (not shown). The light engine 310 is driven by the power and control circuitry 320. The power circuitry of the power and control circuitry 320 may be for example multiple AC line-powered adjustable current drivers, one for each color of LEDs. The control circuitry of the power and control circuitry 320 may respond to control signals to adjust the currents to the multiple colors of LEDs of the light engine 310, causing the light output from the light engine 310 to dim or brighten, resulting in decreased or increased opacity respectively, or assume different CCT or CRI or change color.

Figure 4:
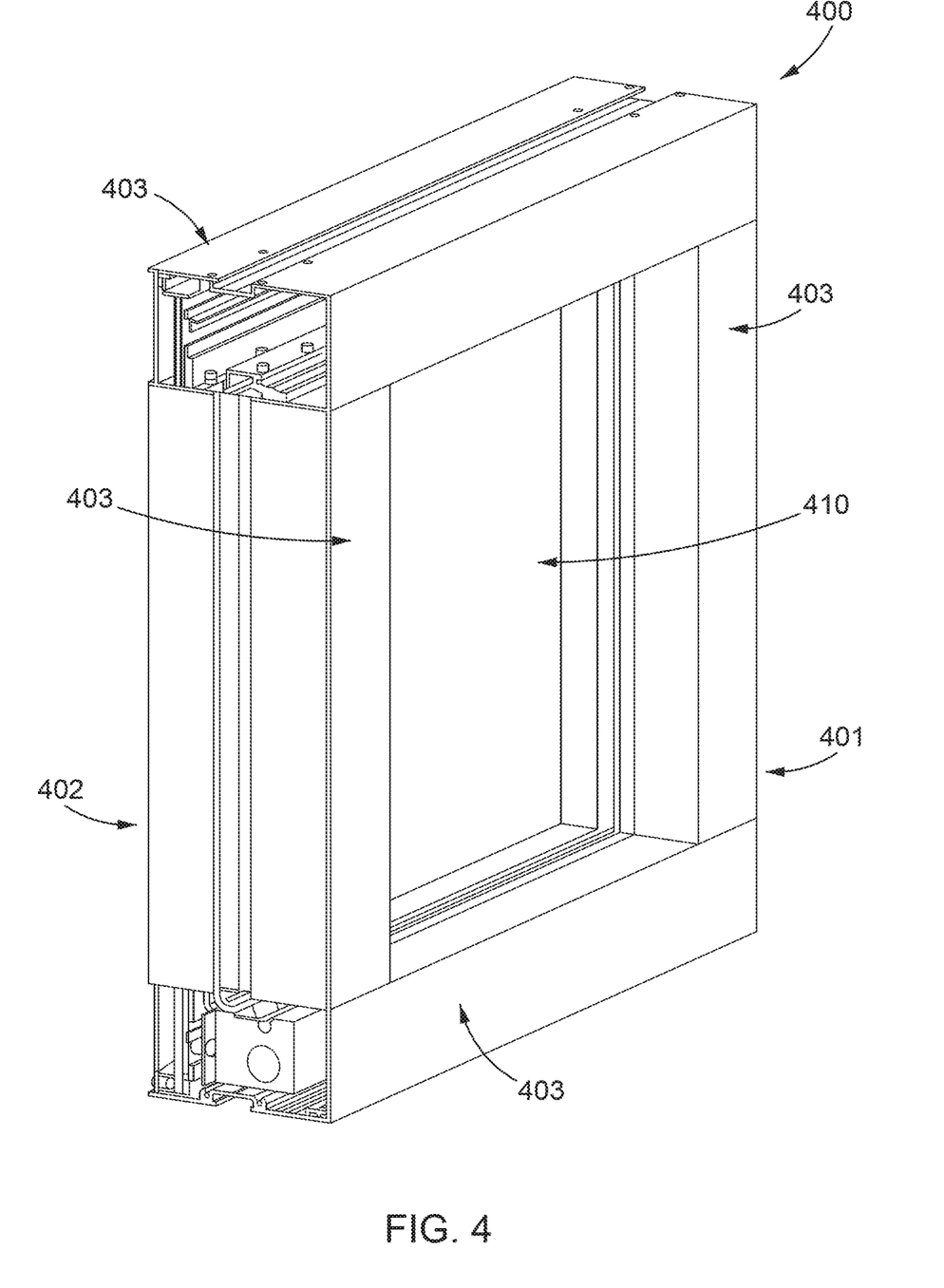
FIG. 4 is a diagram of a frame containing a privacy glass system, according to an embodiment.

FIG. 4 is a diagram of a frame 400 containing a privacy glass system 410, according to an embodiment. As shown in FIG. 4, in an embodiment the frame 400 comprises a front 401, a back 402 and four sides 403. The frame 400 may be designed in such a way that the elements of the privacy glass system 410 may be inserted into the frame 400 before the frame 400 is assembled. The frame 400 further may be designed in such a way that the elements of the privacy glass system 410 are held rigidly in place by the frame 400.

Figure 5:
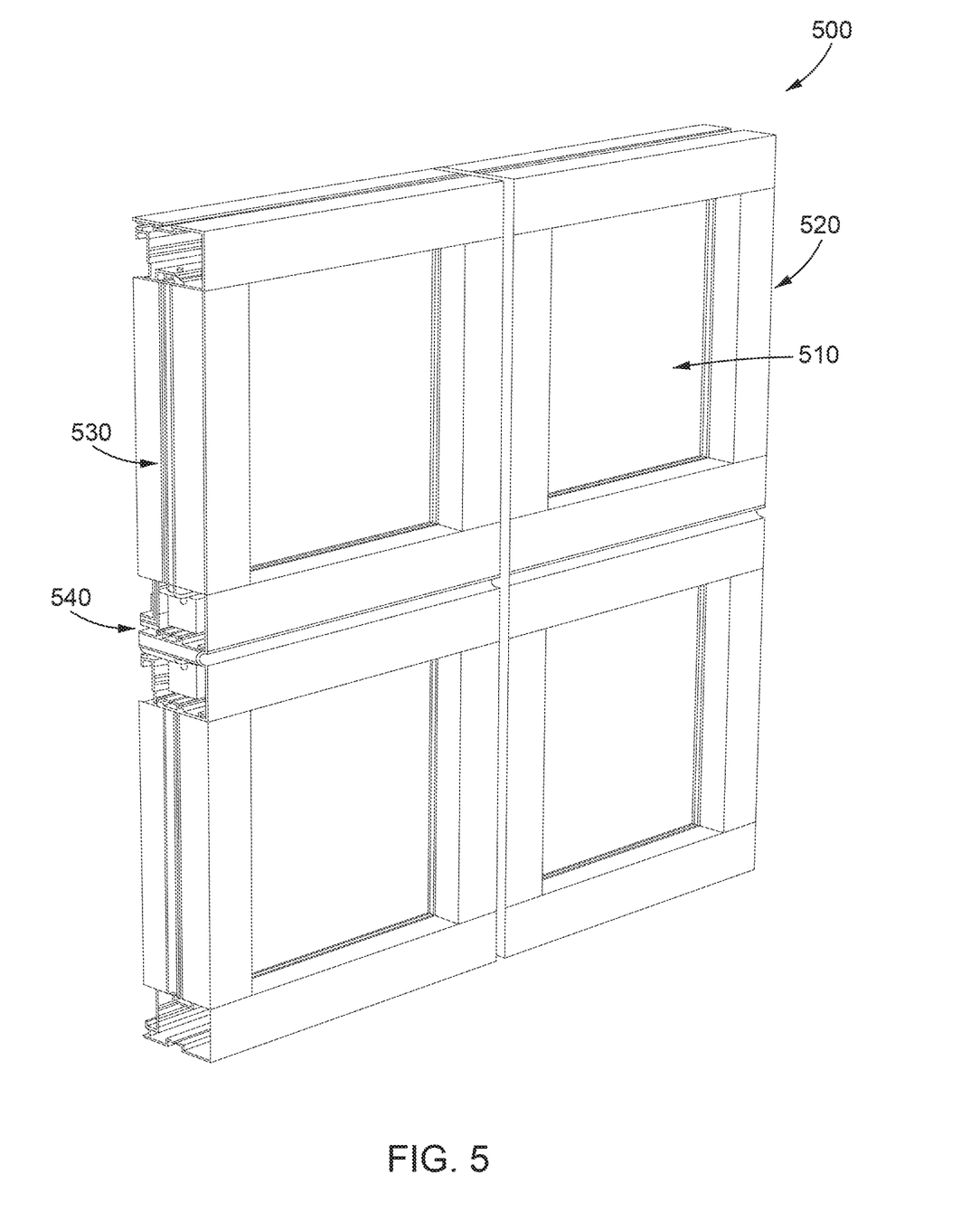
FIG. 5 is a diagram of a frame containing a privacy glass system mounted into an array of such frames, according to an embodiment.

FIG. 5 is a diagram of a frame 520 containing a privacy glass system 510 mounted into an array of such frames 500, according to an embodiment. As shown in FIG. 5, vertical or horizontal wall mount channels 530 are used to position the array 500 of such frames 520, while hardware 540 on the rear of each frame 520 is used to mount the frames 520 against the channels 530.

An embodiment includes a method of operation. In this embodiment, a signal to define a degree of opacity of a diffuser is received from a controller. Then, light is sent by a light engine (such as light engine 110 in FIG. 1), based on the signal, into an edge of the diffuser at a first direction (e.g., edge 121 of diffuser 120 in a direction 125 of FIG. 1) such that light exits the diffuser at a second direction (e.g., direction 141 in FIG. 1) substantially perpendicular to the first direction and diffuser has an opacity based on the degree of opacity. In another embodiment, a control signal is received from a controller to drive the LED driver. The signal represents a brightness of output from a light engine coupled to the LED driver. [0030] It will be apparent to those skilled in the art that various modifications and variation can be made to the disclosed embodiments. In view of the foregoing, it is intended that the disclosure cover modifications and variations of the disclosed embodiments.

While various embodiments have been described and illustrated herein, a variety of other means and/or structures for performing the function and/or obtaining the results and/or one or more of the advantages described herein. More generally, all parameters, dimensions, materials, and configurations described herein are meant to be an example and that the actual parameters, dimensions, materials, and/or configurations will depend upon the specific application or applications. It is, therefore, to be understood that the foregoing embodiments are presented by way of example only and that embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Still further, some embodiments disclosed herein are distinguishable over prior art references by specifically lacking one or more features disclosed in the prior art; that is, claims to such embodiments may include negative limitations so as to be distinguished from the prior art.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A privacy glass system, comprising:
   at least one LED;
   an LED driver coupled to the at least one LED;
   a controller coupled to the LED driver;
   an assembly including at least a first transparent material, a second transparent material, and a diffuser disposed between the first transparent material and the second transparent material and having an edge and an edge portion, the at least one LED configured to light the edge of the diffuser; and
   a frame defining a recess and an infinity edge, the edge portion of the diffuser being disposed within the recess of the frame, the infinity edge of the frame being disposed a non-zero distance from a portion of the assembly closest to the infinity edge of the frame, the first transparent material and the second transparent material not disposed within the recess of the frame,
   the controller is configured to control the LED driver to drive the at least one LED to define a degree of opacity of the diffuser.

2. The privacy glass system of claim 1, wherein the at least one LED is a white LED.

3. The privacy glass system of claim 1, wherein:
   the LED driver is configured to control a brightness of the at least one white LED under control of the controller.

4. The privacy glass system of claim 1, wherein the at least one LED includes a first LED of a first color, a second LED of a second color, and a third LED of a third color.

5. The privacy glass system of claim 1, wherein:
   the at least one LED includes a first LED of a first color, a second LED of a second color, and a third LED of a third color, and
   the LED driver is configured to control a color and/or a brightness of the first LED, the second LED and the third LED, under control of the controller.

6. The privacy glass system of claim 1, wherein the diffuser is an etched light guide plate, and is made of acrylic.

7. The privacy glass system of claim 1, wherein the diffuser is a panel containing diffusion beads.

8. The privacy glass system of claim 1, wherein the diffuser is an LCD panel.

9. The privacy glass system of claim 1, wherein:
   the first transparent material and the second transparent material are each glass.

10. The privacy glass system of claim 1, wherein:
    the transparent material and the second transparent material are each plastic.

11. The privacy glass system of claim 1, further comprising:
    a shroud disposed adjacent to the frame.

12. The privacy glass system of claim 1, wherein the privacy glass system is a first privacy glass system, the privacy glass array further comprising a plurality of privacy glass systems including the first privacy glass system, the plurality of privacy glass systems having channels configured to be mount each privacy glass system to at least one other privacy glass system from the plurality of privacy glass systems, each privacy glass system from the plurality of privacy glass system having hardware to mount that privacy glass system to the channels.

13. The privacy glass system of claim 1, wherein:
    the frame includes a first portion that defines the recess and a second portion that defines the infinity edge, the first portion of the frame being in contact with an end portion of the diffuser, the second portion of frame not being in contact with the portion of the assembly closest to the infinity edge of the frame.

14. A privacy glass system, comprising:
    at least one LED;
    an assembly including at least a first transparent material, a second transparent material, and a diffuser disposed between the first transparent material and the second transparent material, the diffuser having an edge and an edge portion, the at least one LED configured to light the edge of the diffuser; and
    a frame defining a recess and an infinity edge, the edge portion of the diffuser being disposed within the recess of the frame, the first transparent material and the second transparent material not disposed within the recess, the infinity edge of the frame being disposed a non-zero distance from a portion of the assembly closest to the infinity edge of the frame,
    the recess of the frame is defined by a first frame portion, a second frame portion opposite the first frame portion, and a base frame portion disposed between the first frame portion and the second frame portion, the first frame portion having a first end portion and a second end portion opposite the first end portion, the first frame portion having a length between the first end portion and the second end portion, the second frame portion having a first end portion and a second end portion opposite the first end portion of the second frame portion, the second frame portion having a length between the first end portion of the second frame portion and the second end portion of the second frame portion, the length of the first frame portion being less than the length of the second frame portion.

15. The privacy glass system of claim 14, wherein:

an end of the first transparent material abutting the first end portion of the first frame portion, the first end portion of the second transparent material abutting an end of the second frame portion.

16. The privacy system of claim 14, wherein:

the first transparent material having an outer surface and an inner surface, the inner surface of the first transparent material being disposed between the diffuser and the outer surface of the first transparent material, the outer surface of the first transparent material being substantially flush with an outer surface of the first frame portion, the second transparent material having an outer surface and an inner surface, the inner surface of the second transparent material being disposed between the diffuser and the outer surface of the second transparent material, the outer surface of the first transparent material being substantially flush with an outer surface of the second frame portion.

17. The privacy glass system of claim 14, wherein:

the frame includes a first portion that defines the recess and a second portion that defines the infinity edge, the first portion of the frame being in contact with the end portion of the diffuser, the second portion of frame not being in contact with the portion of the assembly closest to the infinity edge of the frame.

* * * * *